United States Patent
Granovsky et al.

(10) Patent No.: US 11,586,552 B2
(45) Date of Patent: Feb. 21, 2023

(54) MEMORY CACHE WITH PARTIAL CACHE LINE VALID STATES

(71) Applicant: Apple Inc., Cupertino, CA (US)

(72) Inventors: Ilya Granovsky, Kiryat Tivon (IL); Tom Greenshtein, Givaat Nesher (IL)

(73) Assignee: Apple Inc., Cupertino, CA (US)

(*) Notice: Subject to any disclaimer, the term of this patent is extended or adjusted under 35 U.S.C. 154(b) by 98 days.

(21) Appl. No.: 17/320,172

(22) Filed: May 13, 2021

(65) Prior Publication Data

US 2022/0365881 A1   Nov. 17, 2022

(51) Int. Cl.
  *G06F 12/08* (2016.01)
  *G06F 12/0891* (2016.01)
  *G06F 12/0846* (2016.01)
  *G06F 12/06* (2006.01)
  *G06F 12/02* (2006.01)
  *G06F 12/0862* (2016.01)

(52) U.S. Cl.
  CPC ...... *G06F 12/0891* (2013.01); *G06F 12/0238* (2013.01); *G06F 12/0646* (2013.01); *G06F 12/0846* (2013.01); *G06F 12/0862* (2013.01)

(58) Field of Classification Search
  None
  See application file for complete search history.

(56) References Cited

U.S. PATENT DOCUMENTS

| | | | | |
|---|---|---|---|---|
| 5,586,297 | A * | 12/1996 | Bryg | G06F 12/0835 711/146 |
| 5,822,763 | A * | 10/1998 | Baylor | G06F 12/0817 711/E12.027 |
| 5,860,158 | A * | 1/1999 | Pai | G06F 12/084 711/130 |
| 8,190,825 | B2 | 5/2012 | Hikichi | |
| 10,762,000 | B2 | 9/2020 | Chang et al. | |
| 2014/0095796 | A1 * | 4/2014 | Bell, Jr. | G06F 12/0855 711/130 |
| 2018/0293175 | A1 * | 10/2018 | Chang | G06F 12/121 |
| 2019/0235762 | A1 * | 8/2019 | Kaburaki | G06F 3/0679 |

* cited by examiner

*Primary Examiner* — Tracy C Chan
(74) *Attorney, Agent, or Firm* — Kowert, Hood, Munyon, Rankin & Goetzel, P.C.; Scott W. Pape; Dean M. Munyon

(57) ABSTRACT

An apparatus includes a cache memory circuit configured to store a cache lines, and a cache controller circuit. The cache controller circuit is configured to receive a read request to an address associated with a portion of a cache line. In response to an indication that the portion of the cache line currently has at least a first sub-portion that is invalid and at least a second sub-portion that is modified relative to a version in a memory, the cache controller circuit is further configured to fetch values corresponding to the address from the memory, to generate an updated version of the portion of the cache line by using the fetched values to update the first sub-portion, but not the second sub-portion, of the portion of the cache line, and to generate a response to the read request that includes the updated version of the portion of the cache line.

20 Claims, 10 Drawing Sheets

Cache memory system 105

| cache tag table 240 | | |
|---|---|---|
| cache line ID 242 | address hash 244 | state 246 "a" "b" |
| "220" | "1234" | "111 001" |
| "222" | "ABCD" | "010 001" |

Cache Line 120:

| entry 230a "valid clean" | entry 230b "valid clean" | entry 230c "valid mod" | entry 230d "invalid" | entry 230e "valid mod" | entry 230f "valid clean" | entry 230g "invalid" | entry 230h "valid mask" |
|---|---|---|---|---|---|---|---|
| portion 120a | | | | | | | |
| entry 230i "valid clean" | entry 230j "valid clean" | entry 230k "valid clean" | entry 230l "valid clean" | entry 230m "valid clean" | entry 230n "valid clean" | entry 230o "valid clean" | entry 230p "valid clean" |
| portion 120b | | | | | | | |

Cache Line 122:

| entry 232a "valid mod" | entry 232b "valid mod" | entry 232c "valid clean" | entry 232d "valid clean" | entry 232e "valid clean" | entry 232f "valid mod" | entry 232g "valid mod" | entry 232h "valid mod" |
|---|---|---|---|---|---|---|---|
| portion 122a | | | | | | | |
| entry 232i "valid clean" | entry 232j "valid clean" | entry 232k "valid clean" | entry 232l "valid clean" | entry 232m "valid clean" | entry 232n "valid clean" | entry 232o "valid clean" | entry 232p "valid clean" |
| portion 122b | | | | | | | |

```
┌─────────────────────────────────────────────────────────┐
│ Indicating, by a cache controller circuit coupled to a  │
│ cache memory circuit, a partial state for a portion of  │
│ a particular cache line of the cache memory circuit in  │
│ response to determining that the portion currently      │
│ includes a first sub-portion that is invalid and a      │
│ second sub-portion that is modified relative to a       │
│ version in a memory.                                    │
│ 610                                                     │
└─────────────────────────────────────────────────────────┘
                              │
                              ▼
┌─────────────────────────────────────────────────────────┐
│ Receiving, by the cache controller circuit, a read      │
│ request for an address associated with the portion of   │
│ the particular cache line.                              │
│ 620                                                     │
└─────────────────────────────────────────────────────────┘
                              │
                              ▼
┌─────────────────────────────────────────────────────────┐
│ Fetching, by the cache controller circuit, values from  │
│ the memory corresponding to the address.                │
│ 630                                                     │
└─────────────────────────────────────────────────────────┘
                              │
                              ▼
┌─────────────────────────────────────────────────────────┐
│ Updating, by the cache controller circuit using the     │
│ fetched values, values of the first sub-portion, while  │
│ values of the second sub-portion remain unchanged.      │
│ 640                                                     │
└─────────────────────────────────────────────────────────┘
                              │
                              ▼
┌─────────────────────────────────────────────────────────┐
│ Responding, by the cache controller circuit, to the     │
│ read request, wherein the response includes the updated │
│ values of the first-portion and the unchanged values of │
│ the second portion.                                     │
│ 650                                                     │
└─────────────────────────────────────────────────────────┘
```

*FIG. 6*

MEMORY CACHE WITH PARTIAL CACHE LINE VALID STATES

BACKGROUND

Technical Field

Embodiments described herein are related to systems-on-a-chip (SoCs) and, more particularly, to methods for operating a cache memory.

Description of the Related Art

System-on-a-chip (SoC) integrated circuits (ICs) generally include one or more processors that serve as central processing units (CPUs) for a system, along with various other components such as memory controllers and peripheral components. Cache memories are frequently used in SoCs to support increased performance of processors by reducing delays associated with memory fetches to system memories and/or non-volatile storage memories. Cache memories may store local copies of information stored in frequently accessed memory addresses. These local copies may have shorter delays for providing stored values to processors than performing a memory access to a target memory address.

When a memory access is made to a target address that is not currently cached, the addressed memory may be accessed, and values from a plurality of sequential addresses, including the target address, are read as a group and may then be cached to reduce future access times. In some cache memories, a single cache line may be sized to hold a single group. In other embodiments, one group may span across two or more cache lines. Individual cache lines are maintained through use of a corresponding cache tag that provides information on the respective cache line, such as validity of the information in the cache line. When the cached information in a cache line becomes invalid or a determination that the cached information has not been accessed frequently, the cached information may be invalidated and marked for eviction, thereby allowing it to be overwritten by other information being accessed by the processors of the SoC.

SUMMARY

In an embodiment, an apparatus includes a cache memory circuit that is configured to store a plurality of cache lines, and a cache controller circuit. The cache controller circuit is configured to receive a read request to an address associated with a portion of a particular cache line. In response to an indication that the portion of the particular cache line currently has at least a first sub-portion that is invalid and at least a second sub-portion that is modified relative to a version in a memory, the cache controller circuit may be further configured to fetch values corresponding to the address from the memory, to generate an updated version of the portion of the particular cache line by using the fetched values to update the first sub-portion, but not the second sub-portion, of the portion of the particular cache line, and to generate a response to the read request that includes the updated version of the portion of the particular cache line.

In a further example, the cache controller circuit may be further configured to set a value in a cache tag associated with the portion of the particular cache line to indicate a partial state, the partial state indicative of the invalid first sub-portion and the modified second sub-portion, and to set the value in the cache tag to indicate a full state, the full state indicative of the updated version of the invalid first sub-portion. In an example, the cache controller circuit may be further configured to receive a partial write request to a different address that corresponds to a portion of a different cache line. In response to a determination that a value in a different cache tag corresponding to the portion of the different cache line indicates a partial state, the cache controller circuit may be configured to store valid values of the partial write request in corresponding entries of the portion of the different cache line without modifying remaining entries in the portion.

In another example, in response to a determination that the partial write request modified all invalid values in the portion of the different cache line, the cache controller circuit may be configured to set the value in the cache tag to indicate a full state. In an embodiment, the cache controller circuit may be further configured to receive a subsequent read request to the address associated with the portion of the particular cache line. In response to a determination that the portion of the particular cache line is currently valid, the cache controller circuit may be configured to generate a response to the subsequent read request that includes the portion of the particular cache line.

In a further embodiment, the cache controller circuit may be further configured to receive a subsequent read request to a different address associated with a portion of a different cache line. In response to an indication that the portion of the different cache line currently has a first sub-portion that is invalid and a second sub-portion that is unmodified relative to a version in the memory, the cache controller circuit may be configured to fetch different values corresponding to the different address from the memory, to generate a response to the subsequent read request that includes the different fetched values, and to update the portion of the different cache line.

In another example, the cache controller circuit may be further configured to send a request to a memory controller to store the updated version of the portion of the particular cache line to locations in the memory corresponding to the address. In a further example, the cache controller circuit may be further configured to track validity of data stored in a given cache line for individual bytes of the given cache line, and to maintain respective cache tags for two portions of the given cache line, wherein each of the two portions is a respective half of the given cache line.

BRIEF DESCRIPTION OF THE DRAWINGS

The following detailed description makes reference to the accompanying drawings, which are now briefly described.

FIG. 2 shows a three tables depicting two cache lines and a cache tag table of an embodiment of a cache memory system.

FIG. 6 illustrates a flow diagram of an embodiment of a method for performing a read request in a cache memory system.

Figure 1:
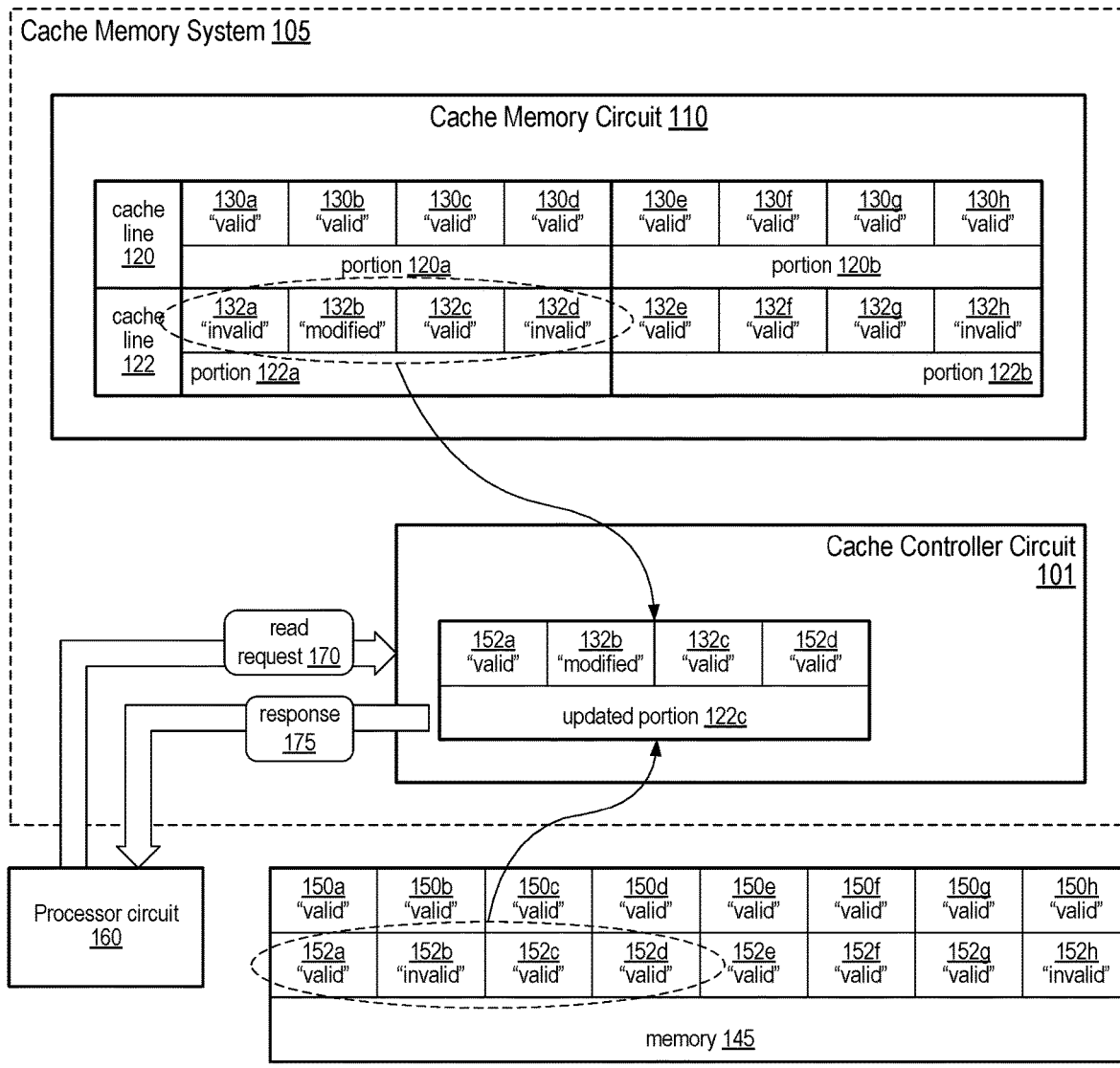
FIG. 1 illustrates a block diagram of an embodiment of a system that includes a cache memory system and a memory.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described, a size of a cache line may be determined by an SoC designer based on a size of a memory access group. Some memory circuits, in response to a read access, return a sequence of words corresponding to a series of consecutive addresses. For example, many dynamic random-access memories (DRAMs) return all words stored in a single physical row of the memory. For efficiency, all of the read words may be placed into one or more cache lines rather than performing subsequent read accesses to the memory if another address from the same memory row is fetched. As memory sizes grow, however, the size of a row of DRAM memory may also grow. Accordingly, cache line sizes may also grow to efficiently cache all of the read words.

A processor coupled to a particular cache may not, however, be capable of managing an entire cache line of words, or receiving such a quantity of words may reduce the performance of the processor. Some processors, therefore, receive a portion of the words in a given cache line, such as half of a cache line rather than the all words in the cache line. The reduced number of words received by the processor may allow the processor to perform at an increased level.

While large cache lines may increase an efficiency of accesses to a system memory, managing cached data may become less efficient. For example, if a cache line stores 128 bytes, and a single byte is invalidated (e.g., the value is modified by a processing circuit not associated with the cache), then the entire cache line may be identified as invalid even though 127 bytes remain valid. Accordingly, some cache memories may support validity tracking using portions of a cache line smaller than the entire cache line. For example, validity may be tracked by half-cache lines, quarter cache lines, words of 16, 32, 64, or more bits, or even down to a byte level. By tracking validity to the byte level, the single byte of the 128 bytes may be indicated as invalid while the other 127 bytes remain valid for use by processors associated with the cache. This more granular level of validity tracking, however, may result in use of read-modify-write operations to read or write data in a cache line. For example, a read request from a processor to an address corresponding to a cache line with at least one invalid entry may result in a read of the cache line as well as a read of the system memory to replace the invalid entry. Results of the two reads are merged and the merged result may be returned to the requesting processor. This may, in some embodiments, result in a longer access time than a simple read to the system memory.

As previously stated, some embodiments utilize a half-cache line access by the processors coupled to a given cache. By tracking cache states using half-cache lines, a cache controller may determine when a read-modify-write operation is not necessary for a given half-cache line. If one or more invalid entries are in an accessed half-cache line, then the read-modify-write operation is used. Otherwise, once all entries in the given half-cache line have been filled with valid information, then the read-modify-write operation may be omitted and replaced with a simpler read or write operation.

The disclosed embodiments address systems and methods for tracking a fill state of a cache line at a half-cache tag level is disclosed. The disclosed methods may increase an efficiency for accessing cached data in a cache that allows data manipulation down to a byte-level. For example, an SoC may include a cache memory circuit and a cache controller circuit that is configured to receive a read request to an address associated with a portion of a particular cache line. The cache controller may, in response to an indication that the portion currently has one or more invalid entries and at least one modified entry, be configured to fetch values corresponding to the address from the memory, and then generate an updated version of the portion of the particular cache line by using the fetched values to update the invalid entries, but not the modified entries. The cache controller circuit may be further configured to generate a response to the read request that includes the updated version of the portion of the particular cache line.

FIG. 1 illustrates a block diagram of one embodiment of a cache memory system. As illustrated, system 100 includes cache memory system 105, processor circuit 160, and memory 145. Cache memory system 105, in turn, includes cache controller circuit 101 and cache memory circuit 110. Cache memory circuit 110 is shown with entries corresponding to two cache lines, 120 and 122. Each of cache lines 120 and 122 include two respective portions.

As illustrated, processor circuit 160 is a circuit that is capable of initiating a memory access as part of a memory transaction and receiving a response to the memory access. Processor circuit 160 is configured to generate read and write requests for addresses in memory 145, and to retrieve and execute instructions from cache memory system 105. Processor circuit 160 may include one or more cores and be configured to implement any suitable instruction set architecture (ISA), such as, e.g., ARM™, PowerPC®, Blackfin®, or x86 ISAs, or combination thereof. In embodiments, processor circuit 160 may be a specialized core such as a floating-point processor, a digital-signal processor, or the like.

Memory 145, as shown, may be implemented as any suitable type of memory circuits including volatile, non-volatile memory, and combinations thereof. Memory 145 may include one or more memory management controllers and may include memory circuits, such as, static random-access memory (SRAM), as well as interfaces for accessing dynamic random-access memory (DRAM) and/or non-volatile memories such as flash memory. As an example, memory 145 may include SRAM, a first memory controller circuit for accessing DRAM, and a second memory controller for accessing flash memory. Program instructions and various types of data files may be stored in the flash data for long-term storage, such as when system 100 is powered-down. During a boot process, an operating system and one or more applications may be launched, including copying at least some of the instructions and related information into DRAM and/or SRAM for faster access by processor circuit 160.

To further reduce access times to the subsets of the booted operating system and/or launched applications, memory locations that are accessed by processor circuit 160 may be cached in cache memory system 105. Cache memory system 105 is configured to cache, in portions of cache lines 120 and 122, values associated with memory 145 in response to the read and write requests generated by processor circuit 160. As shown, memory 145 includes addresses 150*a*-150*h* and 152*a*-152*h*.

Cache memory circuit 110, as illustrated, is configured to store a plurality of cache lines, including cache lines 120 and 122. Once data has been cached, each of cache lines 120 and 122 may be accessed by processor circuit 160 by portions 120*a*, 120*b*, 122*a*, and 122*b*. As illustrated, each portion is one-half of a cache line. In other embodiments, cache lines 120 and 122 may be divided into smaller portions, such as thirds, fourths, eighths, and so forth. In some embodiments, a portion of cache lines 120 and 122 may include the entire cache line. Each of the illustrated portions includes a number of entries, each entry including a byte or word of data corresponding to an address in memory 145. Cache line 120 is shown with eight entries 130*a*-130*h* that correspond to memory addresses 150*a*-150*h*, and cache line 122 with entries 132*a*-132*h* that correspond to memory addresses 152*a*-152*h*. Portions 120*a*-120*b* and 122*a*-122*b* each include a respective four of the entries.

Cache controller circuit 101, as depicted, is configured to determine when and where to store a particular set of accessed memory locations. Based on an address used to fetch data from memory 145, cache controller circuit 101 determines one or more possible cache lines in cache memory circuit 110 in which to store the returned data. To make such determinations, cache controller circuit 101 is further configured to track validity of each individual entry within a given cache line. As shown, cache controller circuit 101 tracks if a given entry is "valid" (the data stored in the entry has a same value as the corresponding address in memory 145 and has not been modified outside of cache memory circuit 110 by a different circuit within system 100), "modified" (the data stored in the entry has been modified such that the value in the entry in cache memory circuit 110 differs from the value stored at the corresponding address in memory 145), and "invalid" (the data stored in the entry has been modified outside of cache memory circuit 110 by a different circuit). Since the validity of cached data is maintained for each entry, processor circuit 160 may read the modified or valid contents of entries 132*b* and 132*c*, respectively, even though entries 132*a* and 132*d* are invalid.

As illustrated, cache controller circuit 101 is configured to receive read request 170 to an address associated with portion 122*a* of cache line 122 (also referred to as a cache hit in portion 122*a*). In response to an indication that portion 122*a* of cache line 122 currently has at least a first sub-portion that is invalid (e.g., entries 132*a* and 132*d*) and at least a second sub-portion (e.g., entry 132*b*) that is modified relative to a version in memory 145, cache controller circuit 101 is configured to fetch values corresponding to the address from memory 145. After the fetched values are returned from memory 145, cache controller circuit 101 is further configured to generate updated portion 122*c* of cache line 122 by using the fetched values (memory addresses 152*a*-152*d*) to update the first sub-portion (entries 132*a* and 132*d*), but not the second sub-portion (entry 132*b*), of portion 122*a*. After updated portion 122*c* has been generated, cache controller circuit 101 is configured to generate response 175 to read request 170 that includes updated portion 122*c* of cache line 122.

Cache controller circuit 101, as depicted, is configured to indicate, for portion 122*a* of cache line 122, a partial state indicating that portion 122*a* currently includes the first sub-portion that is invalid and the second sub-portion that is modified relative to the corresponding address in memory 145. When a hit portion of a given cache line, such as portion 122*a*, is in the partial state, the invalid entries are updated before returning the values of the hit cache line to the requesting processor. Otherwise, the requesting processor would receive out-of-date data, which could lead to incorrect functioning, including, for example, a crash of an application running on the processor, or even a crash of an operating system. Values for the modified entries, however, may only be valid in the hit cache line, as a backfill may not have been performed or may still be in progress in the memory system. Accordingly, to provide this most recently modified value that is stored in entry 132*b*, the value is provided from portion 122*a* of cache line 122, and therefore is not overwritten by the value in memory 145 (address 152*b*) which has yet to be updated to the value in cache line entry 132*b*. Since the value in entry 132*c* is valid, this value is the same as the value in memory address 152*c*. Accordingly, in various embodiments, values for valid entries may be provided from the read of portion 122*a* or from the read of memory 145.

In addition to generating updated portion 122*c*, cache controller circuit 101, as shown, is further configured to update invalid entries 132*a* and 132*d* using the values from the corresponding memory addresses 152*a* and 152*d*. After this update, cache controller circuit 101 tracks the updated entries as valid. Accordingly, cache controller circuit 101 is further configured to receive a subsequent read request to the address associated with portion 122*a* of cache line 122, and in response to a determination that portion 122*a* of cache line 122 is currently valid, generate a response to the subsequent read request that includes portion 122*a* of cache line 122. After all entries 132*a*-132*d* of portion 122*a* are updated in response to read request 170, all of the entries of portion 122*a* are either valid or modified. When the subsequent read request is received, cache controller circuit 101 may omit a fetch of values from memory 145 and instead return the just values from portion 122*a*.

By tracking validity of data in cache lines at a cache entry level, data stored in cache lines may be used for more accesses before the cache line is invalidated and eventually evicted and refilled. Validity tracking at the entry level may, however, result in use of more read-modify-write operations to compensate for invalid data in a hit cache line. By tracking a partial state of a retrievable portion of a cache line, a cache controller may be capable of determining whether a read-modify-write operation is to be used to provide accurate data values to a requesting circuit. Since a read-modify-write operation that includes a system-memory access may take a longer time to perform than just a system memory access, determining when a read-modify-write operation is avoidable may reduce a time for providing results to the requesting circuit, and thereby increase bandwidth of the requesting circuit.

It is noted that system 100, as illustrated in FIG. 1, is merely an example. The illustration of FIG. 1 has been simplified to highlight features relevant to this disclosure.

Various embodiments may include different configurations of the circuit elements. For example, only two cache lines are shown for cache memory circuit 110. Any suitable number of cache lines may be included in other embodiments. In addition, a single processor circuit and single memory are shown. In other embodiments, multiple processor circuits and/or multiple memories may be included in system 100.

The cache memory system illustrated in FIG. 1 is shown in a simplified depiction. Cache memory systems may be implemented in various fashions. One example of a cache memory system is shown in FIG. 2.

Moving to FIG. 2, three tables depicting an embodiment of a cache memory system is shown. FIG. 2 depicts a different embodiment of cache memory system 105 of FIG. 1, in which cache lines and portions thereof include additional entries. Cache memory system 105, as shown, includes depictions of two cache lines, 120 and 122, each including two respective portions with eight entries included in each portion. Cache line 220 includes portion 120a with entries 230a-230h, and portion 120b with entries 230i-230p. Similarly, cache line 222 includes portion 22a with entries 232a-232h, and portion 122b with entries 232i-232p. Cache memory system 105 also includes cache tag table 240. Each row of cache tag table 240 depicts one cache tag, each tag including a cache line identification (ID) 242, an address hash 244, and two state indicators, one for each portion of a corresponding cache line.

As illustrated, cache tag table is maintained by a cache controller circuit, such as cache controller circuit 101 in FIG. 1. Cache tag table 240 is shown with two tags, one corresponding to cache line 220 and the other corresponding to cache line 222. Cache line ID 242 identifies a particular cache line to which a given cache tag corresponds. The two values of cache line ID 242 ("220" and "222") indicate that a first cache tag corresponds to cache line 220 and a second cache tag corresponds to cache line 222. In some embodiments, cache line ID 242 may be implemented as address decode logic for a memory such as an SRAM or a register file, such that a particular number of bits corresponding to the address comprise the cache tag for the corresponding cache line. In other embodiments, cache line ID 242 may be included in memory cells of a memory used to store cache tag table 240, such as a content-addressable memory.

Address hash 244, as shown, is a hash of an address in a system memory, such as memory 145 in FIG. 1. Address hash 244 is used by the cache controller circuit to determine if an address in a received memory request hits or misses a cache line in cache memory system 105. Any suitable hashing algorithm may be used for determining respective address hashes 244. For example, when a read request 170 is received by cache controller circuit 101, an address in read request 170 that corresponds to a location in memory 145 is processed using the hashing algorithm, and the resulting hash value is compared to address hashes 244 in cache tag table 240, if there is a match, then read request 170 hits a cache line, and values corresponding to the location in memory 145 are cached within cache memory system 105, allowing for a potentially faster access to the values than if memory 145 were accessed instead. In some embodiments, an address hash 244 may be included for each portion of a given cache line. In other embodiments, a portion of the address from the memory request is used to determine which portion of a hit cache line corresponds to the address.

As illustrated, each cache tag in cache tag table 240 also includes state 246. Each value of state 246 includes one or more bits corresponding to a state of each portion of the corresponding cache line. For example, state 246 for cache line 220 includes three bits in the "a" column to indicate a state of "111" for portion 120a, and three bits in the "b" column to indicate a state of "001" for portion 120b. Although three bits are used in the illustrated example, any suitable number of bits may be used to track a desired number of states.

Using three bits, up to eight different states may be tracked for each portion, including, for example, invalid, clean, full, data pending, data pending modified, partial, cache tag locked clean and cache tag locked full. "Invalid" corresponds to the associated cache line portion having at least one entry that is invalid and any remaining entries being clean. "Clean" refers to a portion in which all entries are valid and unmodified, meaning the values in all entries of the portion are the same as the values in the corresponding location in memory 145. "Full" refers to all entries being valid (no invalid entries) and at least one entry having a modified value that has not been written back to memory 145. Any remaining unmodified entries are clean. "Data pending" includes portions in which a fetch has been initiated to memory 145 to fill or update the entries of the portion. "Tag lock clean" and "tag lock full" indicate that the associated portions are locked from further use and are marked for eviction. If one entry in the portion is modified, then the tag lock full state is used, otherwise all entries are clean.

"Partial" refers to a portion in which at least one entry is invalid and at least one entry is modified from the memory 145. Any additional entries may be clean. When a portion of a cache line is invalid, a particular entry is used to store a valid mask that indicates which entries of the portion are valid. Entry 230h is used in portion 120a to store the valid mask. As described above in regards to FIG. 1, a read request that hits a portion with a partial state, such as portion 120a, results in a read-modify-write operation being performed to update the invalid entries. The read-modify-write operation includes a fetch to memory 145 to retrieve values for updating the invalid entries. After the fetch is initiated, the state of a partial portion is updated to "data pending partial" to indicate that the fetch is in progress.

Cache controller circuit 101, as illustrated, is configured to set a value in a given cache tag associated with a given portion of a particular cache line to indicate a respective state. For example, cache controller circuit 101 is configured to set a value in the cache tag associated with portion 120a of cache line 220 to indicate the partial state. As described, the partial state is indicative of invalid entries 230d and 230g and modified entries 230c and 230e. In addition, the "valid mask" value is placed into portion 120a in place of an invalid entry, so entry 230h may also be invalid. The further presence of clean entries 230a, 230b, and 230f does not impact the current partial state of portion 120a.

If a memory fetch is issued by cache controller circuit 101 to update invalid entries 230d, 230g, and 230h, then cache controller circuit 101 is configured to set the value of the cache tag for portion 120a to indicate the data pending partial state. After the invalid entries are updated, cache controller circuit 101 is configured to set the value of the cache tag for portion 120a to indicate the full state, as entries 230d, 230g, and 230h will now be clean. Cache controller circuit 101 is also configured to set a value in the cache tag associated with portion 122a to the modified state, and to set a value in the cache tags associated with portion 120b of cache line 220 and portion 122b of cache line 222 to indicate clean states.

In some embodiments, cache controller circuit 101 is configured to track validity of data stored in a given cache line for individual bytes of the cache line. Accordingly, in such embodiments, each of entries 230 and 232 correspond to one byte of data. In other embodiments, a single cache entry may correspond to 16-, 32-, 64-, or any other suitable size of word. As illustrated, cache controller circuit 101 is configured to maintain respective cache tags for two portions of a given cache line, each of the two portions corresponding to a respective half of the given cache line.

It is noted that the embodiment of FIG. 2 is one depiction of a cache memory system. Although only two cache lines are shown, in other embodiments, any suitable number of cache lines may be included. In addition, although two portions are depicted for each cache line, cache line may be divided into any suitable number of portions, or may be tracked as a single portion for the entire cache line. The sixteen entries of the example cache lines are but one example chosen for clarity. A given cache line may include any suitable number of entries per cache line in other embodiments.

Figure 3:
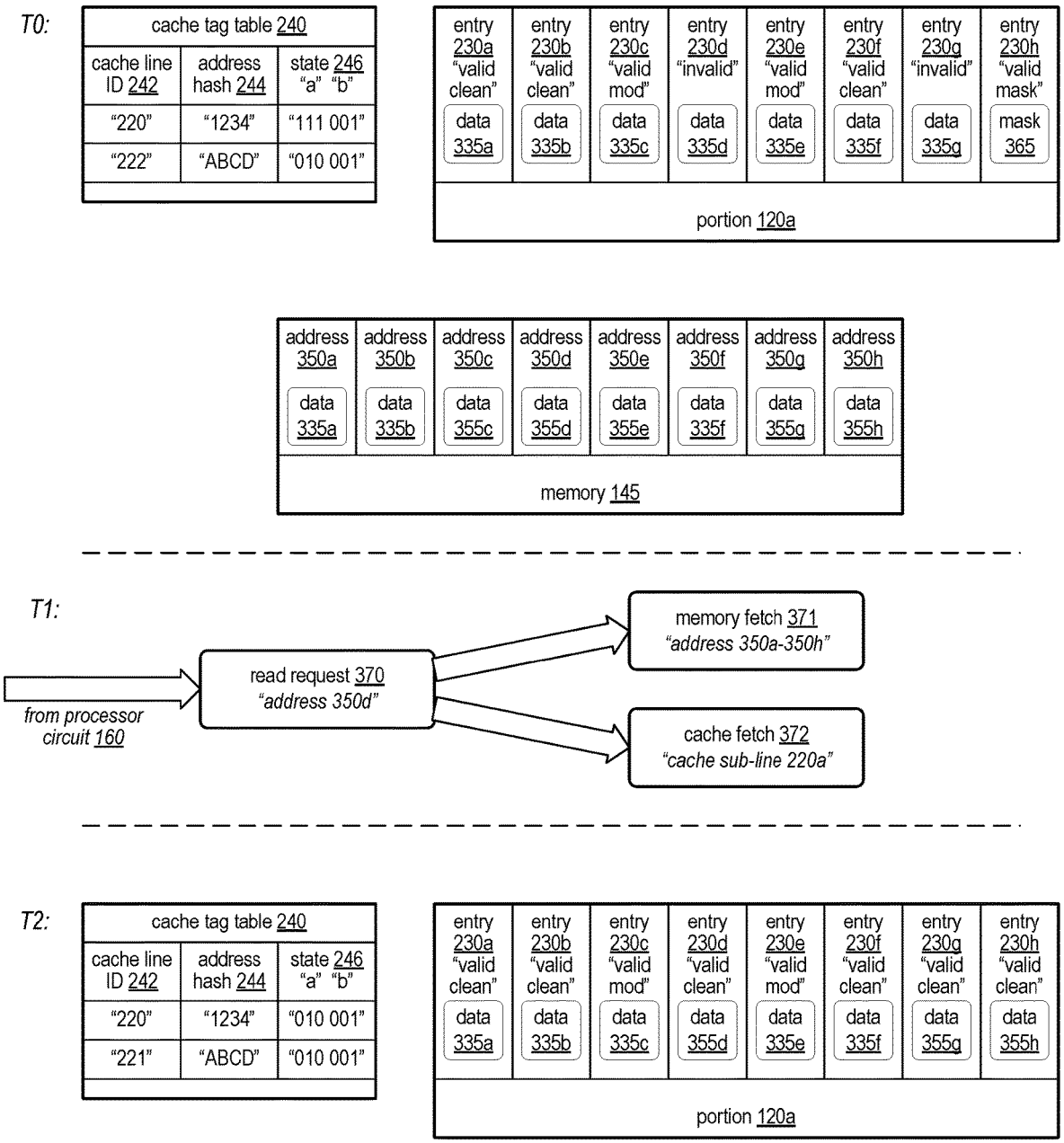
FIG. 3 depicts tables showing states of a cache line and a cache tag table before and after performing a read request in an embodiment of the cache memory system of FIG. 2.
Figure 4:
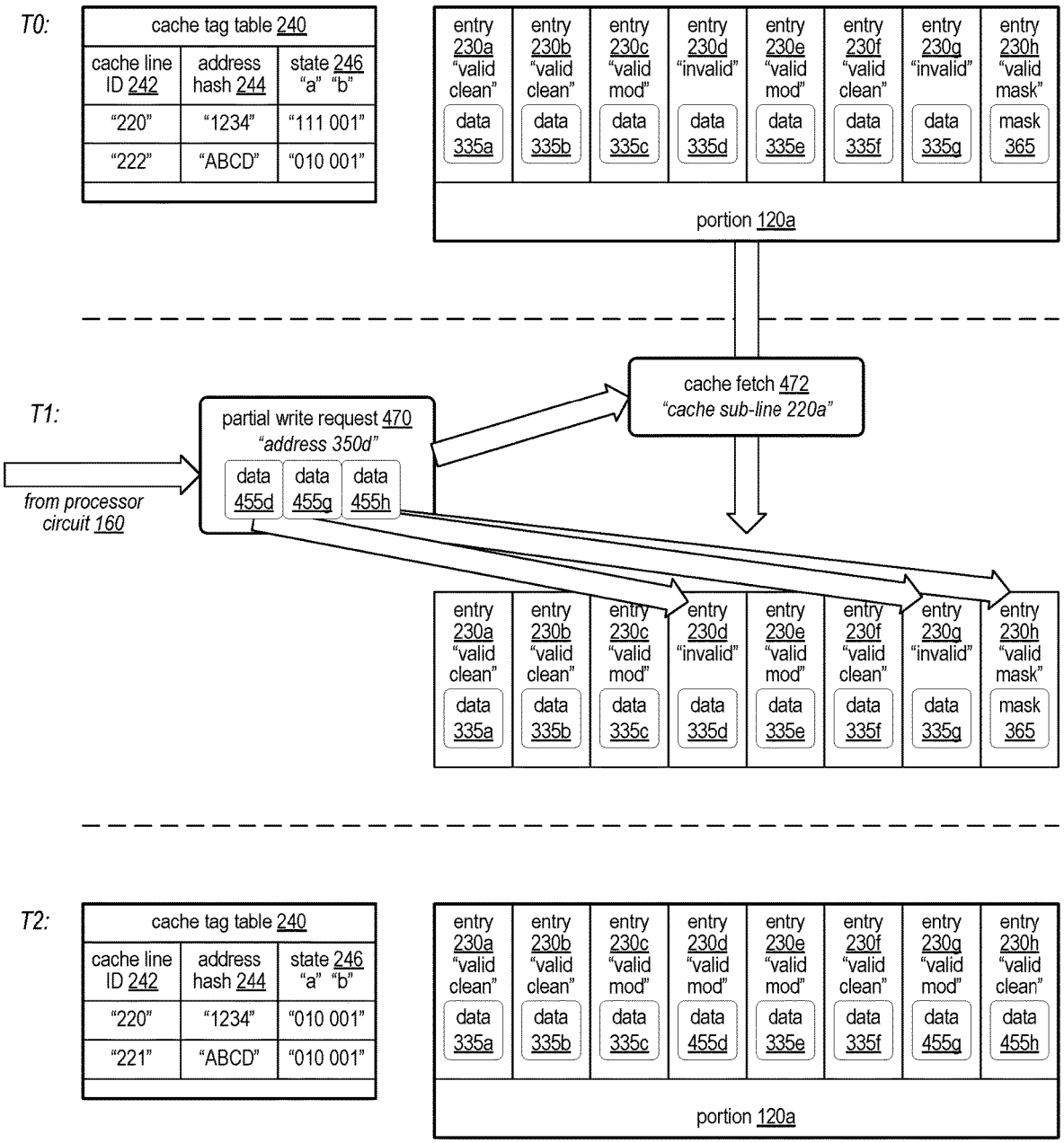
FIG. 4 illustrates tables depicting states of a cache line and a cache tag table before and after performing a partial write request in an embodiment of the cache memory system of FIG. 2.
Figure 5:
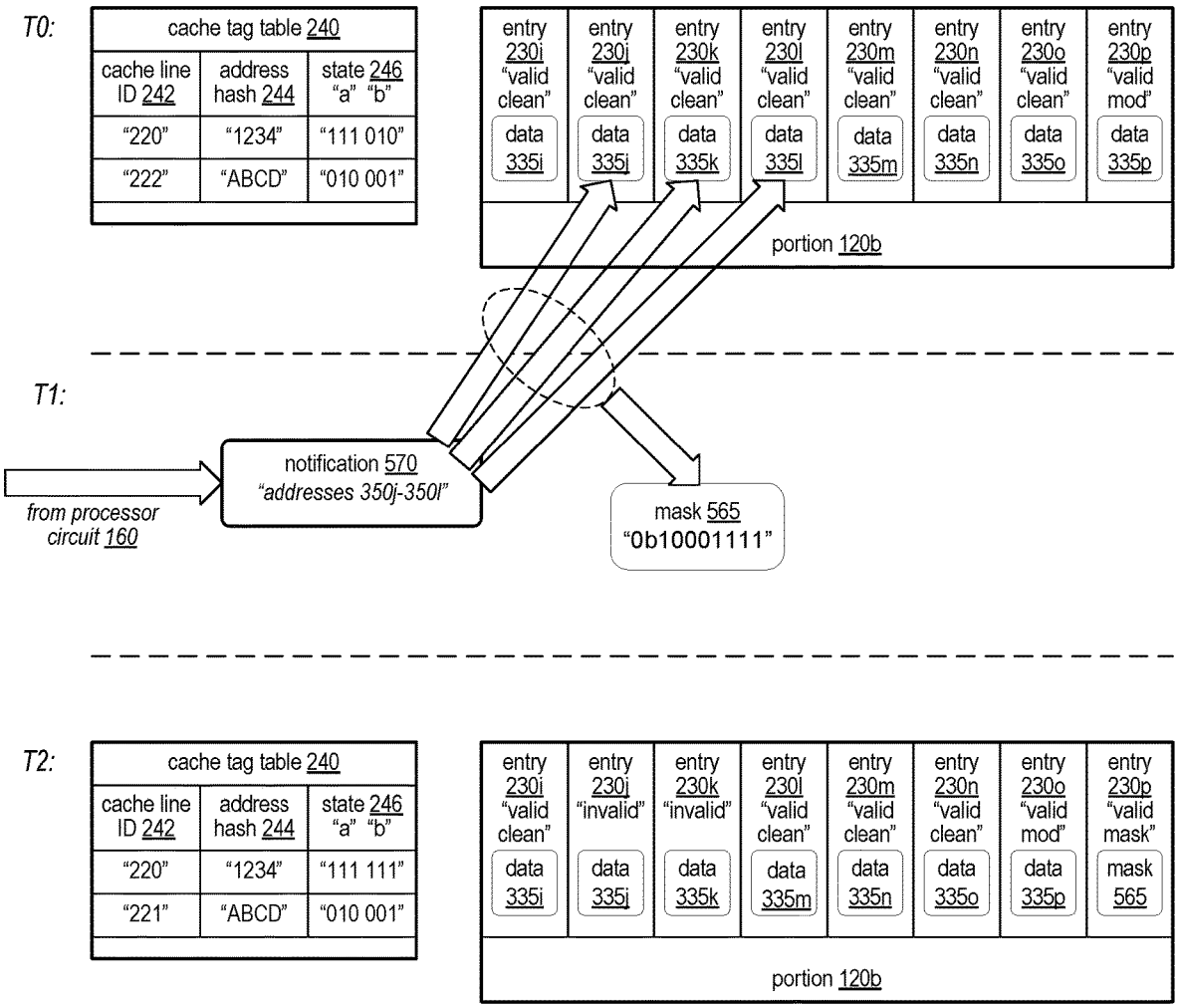
FIG. 5 shows tables illustrating states of a cache line and a cache tag table before and after receiving a notification in an embodiment of the cache memory system of FIG. 2.

The description of FIG. 2 illustrates an organizational structure for managing validity of data in a cache memory system. Cache line states may change over time as memory requests are received in a system such as system 100. FIGS. 3-5 depict three examples of how a cache controller circuit manages cached data and cache tags for an example of a portion of a cache line.

Turning to FIG. 3, an example of managing a cache memory system in response to a read request is shown. An example of cache line portion 120a and cache tag table 240 of cache memory system 105 are illustrated at different times, before and after cache memory system 105 receives read request 370 that hits portion 120a.

At time t0, portion 120a is in the partial state, as shown by the corresponding cache tag in cache tag table 240. The value of state 246 for portion 120a is "111," indicating the partial state. A first sub-portion of portion 120a (e.g., entries 230*d*, 230*g*, and 230*h*) are invalid, and a second sub-portion of portion 120a (e.g., entries 230*c* and 230*e*) are modified. Memory addresses corresponding to the cached values in portion 120a are shown in memory 145.

At time t1, as illustrated, read request 370 is received from processor circuit 160. Read request 370 has a target address of 350*d* of memory 145, which is a cache hit for portion 120a. Since portion 120a has a partial state, at least one entry in portion 120a is modified from its respective location in memory 145. In this example, entries 230*c* and 230*e* (storing data 335*c* and 335*e*, respectively) are modified from the respective memory addresses 350*c* and 350*e* of memory 145 (storing data 355*c* and 355*e*, respectively). The values of data 335*c* and 335*e* are newer than the values of data 355*c* and 355*e*. Since entries 230*d* and 230*g* are invalid, the values of data 335*d* and 335*g* are older than values of data 355*d* and 355*g*, while the value of mask 365 in entry 230*h* is not the same as the value of data 355*h*.

As illustrated, all values corresponding to a portion of a cache line are returned in response to a read request to any one address within that cache line. Accordingly, cache controller circuit 101 performs a read-modify-write operation to merge the modified second sub-portion of portion 120a with values from memory 145. To merge the values, cache controller circuit 101 issues memory fetch 371 to retrieve values for addresses 350*a*-350*h* while concurrently access values from entries 230*a*-230*h* with cache fetch 372. After data 355*a*-355*h* has been received from memory 145, cache controller circuit 101 uses mask 365 to determine which entries are replaced with the data from memory 145. In the present example, as shown at time t2, data 355*d*, 355*g*, and 355*h* replace the former values in respective entries 230*d*, 230*g*, and 230*h*, and are tracked by cache controller circuit 101 as now being clean. State 246 for portion 120a is updated to "010" to indicate the modified state since entries 230*c* and 230*e* are still modified in comparison to addresses 350*c* and 350*e*, which have yet to be backfilled. Furthermore, cache controller circuit 101 is configured to generate a response to read request 370 that includes the updated version of portion 120a.

After time t2, if cache controller circuit 101 receives a subsequent read request to an address associated with portion 120a, then, in response to a determination that the portion of the particular cache line is currently valid (e.g., modified or clean), cache controller circuit 101 is configured to generate a response to this subsequent read request that includes the portion of the particular cache line.

If, at time t0, entries 230*d*, 230*g*, and 230*h* are invalid as shown, but none of the valid entries are modified (e.g., the remaining entries are all clean), then portion 120a is in an invalid state and a cache read to an address associated with portion 120a is treated as a miss. Repeating the example of FIG. 3 with no modified entries, cache controller circuit 101 receives read request 370 to address 350*d* associated with portion 120a. In response to an indication (e.g., from the corresponding cache tag) that portion 120a currently has a first sub-portion that is invalid (entries 230*d*, 230*g*, and 230*h*) and remaining entries are unmodified relative to addresses 350*a*-350*h* in memory 145, then cache controller circuit 101 is configured to fetch values corresponding to the address from memory 145 (memory fetch 371), and generate a response to read request 370 that includes the fetched values from memory 145. Cache controller circuit 101 is further configured to update portion 120a using the fetched values from memory 145 and update the state 246 of portion 120a to clean.

Proceeding to FIG. 4, an example of managing a cache memory system in response to a partial write request is shown. The example of cache line portion 120a and cache tag table 240 are reused from FIG. 3, originating in the same state at time t0. A partial write request 470 is received at time t1.

Partial write request 470, as shown, includes new values for three of the eight entries 230 in portion 120a. In response to a partial write request, only values corresponding to specific addresses are modified. Non-addressed values remain unchanged. At time t1, cache controller circuit 101 receives partial write request 470 to address 350*d* that corresponds to portion 120a. Partial write request 470 includes new values for addresses 350*d*, 350*g*, and 350*h*, which correspond to entries 230*d*, 230*g*, and 230*h*, respectively, of portion 120a. In response to a determination that a value for state 246 in the cache tag corresponding to portion 120a indicates a partial state (e.g., the value "111"), cache controller circuit 101 is configured to store valid values of partial write request 470 in entries 230*d*, 230*g*, and 230*h*, of portion 120a without modifying remaining entries in portion 120a. For example, cache controller circuit 101 may issue cache fetch 472 to retrieve the values in portion 120a, update the values in entries 230*d*, 230*g*, and 230*h*, and then store the modified values back into portion 120a.

At time t2, cache controller circuit 101 is further configured to, in response to a determination that partial write request 470 modified all invalid values in portion 120a, set the value for state 246 in cache tag table to indicate the full state (e.g., "010"). For example, cache controller circuit 101 updates mask 365 to indicate the newly modified entries are modified. In response to a determination, using the updated mask 365, that no entries of portion 120a remain invalid, cache controller circuit 101 updates the value of state 246 corresponding to portion 120a. The value for the updated mask 365 may further be discarded since all entries are now valid. Cache controller circuit 101 may further issue a backfill request to memory 145 to update the values of the corresponding addresses in memory 145 to the modified values in portion 120a. Such a backfill request may, however, have a low priority, and portion 120a remains in the full state until after the backfill has been completed.

If cache controller circuit 101, for example, receives a subsequent read request to the address associated with portion 120a, then cache controller circuit 101 is further configured to, in response to a determination that portion 120a is currently valid (e.g., in the full state or the clean state), generate a response to the subsequent read request that includes values currently stored in portion 120a. For example, a memory read request that hits on portion 120a while it is in the full state, causes cache controller circuit 101 to return the cached values in entries 230a-230h without accessing memory 145.

Moving to FIG. 5, an example of managing a cache memory system, in response to a notification of cached data being modified externally to cache memory system 105, is depicted. In this example, cache line portion 120b and cache tag table 240 are reused from FIG. 2. Notification 570 is received at time t1.

As illustrated, portion 120b of cache line 220 includes seven entries that are clean (entries 230i-230o) and entry 230p that is modified. Accordingly, a value of state 246 corresponding to portion 120b ("010") indicates that portion 120b is in the full state. At time t1, cache controller circuit 101, as shown, receives notification 570 that one or more values corresponding to a first sub-portion of portion 120b have been modified external to cache memory circuit 110. In the example, values corresponding to entries 230j-230l have been modified outside of cache memory circuit 110. In various embodiments, the modifications may have been implemented directly to addresses 350j-350l in memory 145, or entries in a different cache memory system that also correspond to addresses 350j-350l were modified. In either case, the values in entries 230j-230l do not represent the latest values associated with addresses 350j-350l. Cache controller circuit 101 uses notification 570 to generate mask 565, to identify the now invalid entries 230j-230l.

As illustrated at time t2, cache controller circuit 101 is configured to determine whether any modified values remain in a second sub-portion (entries 230i, and 230m-230p) of portion 120b. In response to a determination that at least one modified value remains in the second sub-portion (entry 230p), cache controller circuit 101 is further configured to store a partial state flag value (e.g., "111") in the cache tag corresponding to portion 120b to indicate the partial state. In addition, cache controller circuit 101 is configured to replace one of the invalid entries with mask 565. In the illustrated example, the mask value is always stored in the most significant entry of an associated portion. Placing the mask value in a same relative entry in an associated portion allows cache controller circuit 101 to know which entry includes the mask value without having to make a separate determination when one or more invalid entries are included in a given portion. In other embodiments, a different one of the entries may be utilized. To store mask 565, cache controller circuit 101 shifts values in all valid entries (clean or modified) to the next least significant entry until a first invalid entry is overwritten. In the present example, data values 335m-335p are shifted into entries 230l-230o, and mask 565 is placed into entry 230p.

If at time to, entry 230p is clean rather than modified as shown, cache controller circuit 101 is configured to, in response to a determination that no modified values remain in the second sub-portion, store a partial clean flag value in the cache tag to indicate that at least one value in portion 120b is invalid but no valid values in the portion are modified relative to their corresponding addresses in memory 145. In the examples disclosed herein, a partial clean state corresponds to the invalid state. In other words, since none of the valid values are modified, these valid values can be read from memory 145, and the portion of the cache line could be evicted without losing modified data. A read request that hits in portion 120b will instead be treated as a miss, and the values will be fetched from memory 145. These fetched values, in addition to being returned to the requestor (e.g., processor circuit 160), may also be used to update the invalid entries of portion 120b and place portion 120b in a clean state.

In some embodiments, in response to the invalid state of portion 120b, cache controller circuit 101 is further configured to determine to invalidate cache line 220, including portion 120b. For example, if portion 120a is in the clean or invalid state when portion 120b is placed into the invalid state, then cache controller circuit 101 may determine that the entire cache line may be invalidated and evicted without losing any modified values. In response to this determination, cache controller circuit 101 is configured to indicate a locked state (e.g., tag lock clean, as described above) for each portion (220a and 220b) of cache line 220. This locked state may prevent further modifications to the values in portions 220a and 220b until cache line 220 has been evicted.

It is further noted that the examples of FIGS. 3-5 are merely for demonstrating the disclosed techniques. In these examples, cache tag table 240 has been shown with two cache tags, each including a particular number of values. In other embodiments, any suitable number of cache tags may be included to track any suitable number of cache lines included in the cache memory system. The three examples are not intended to describe all possible cases related to cache line management and validity tracking, but rather to provide sufficient details for disclosing the associated techniques.

The circuits and techniques described above in regards to FIGS. 1-5 may manage a cache memory system using a variety of methods. Three methods associated with cache memory management are described below in regards to FIGS. 6-8.

Moving now to FIG. 6, a flow diagram for an embodiment of a method for receiving a read request by a cache memory system is shown. Method 600 may be performed by a cache controller circuit, such as cache controller circuit 101 in FIG. 1. Referring collectively to FIGS. 1 and 6, method 600 begins in block 610.

At block 610, method 600 includes indicating, by cache controller circuit 101 coupled to cache memory circuit 110, a partial state for portion 122a of cache line 122 of cache memory circuit 110 in response to determining that portion 122a currently includes a first sub-portion that is invalid and a second sub-portion that is modified relative to a version in memory 145. As shown in FIG. 1, the first sub-portion includes entries 132a and 132d that are both invalid, while the second sub-portion includes entry 132b that currently stores a modified value that has not yet been backfilled into a corresponding memory location of memory 145. Indicating the partial state includes storing, by cache controller circuit 101, a particular value in a cache tag associated with portion 122a of cache line 122. For example, a value for state 246 in cache tag table 240 of FIG. 2 may be set to indicate the partial state in a cache tag corresponding to portion 122a.

Method 600, at block 620, further includes receiving, by cache controller circuit 101, read request 170 for an address associated with portion 122a of cache line 122. Read request 170, as illustrated, is sent by processor circuit 160, targeting one or more addresses that are associated with values currently cached in portion 122a of cache memory circuit 110. In some embodiments, cache controller circuit 101 returns all values in a given portion of a cache line in response to at least one value in the portion is read. Accordingly, cache controller circuit 101 prepares to send all values in entries 132a-132d in response to read request 170.

At block 630, method 600 also includes fetching, by cache controller circuit 101, values from memory 145 corresponding to the address. Cache controller circuit 101, in response to determining that the values cached in entries 132a and 132d are invalid, issues a fetch request to memory 145 to retrieve the current values corresponding to entries 132a and 132d. As shown, values from memory addresses 152a-152d correspond to the currently cached values in entries 132a-132d.

Method 600 also includes, at block 640, updating, by cache controller circuit 101 using the fetched values, values of the first sub-portion, while values of the second sub-portion remain unchanged. As stated, the values in entries 132a and 132d are to be updated before responding to read request 170. Since the value in 132b is modified and, therefore, newer than the corresponding value in memory address 152b, the value in 132b must not be overwritten. The retrieved values from addresses 152a and 152d are, therefore, stored in entries 132a and 132d, making these values clean, and therefore valid. The retrieved value from address 152b is ignored, allowing the current value in entry 132b to remain. It is noted that, since the value in entry 132c is valid and clean, it matches the retrieved value from address 152c. Accordingly, cache controller circuit 101 may, in various embodiments, either overwrite the cached value in entry 132c with the same retrieved value, or ignore the value retrieved from 152c.

At block 650, the method further includes responding, by cache controller circuit 101, to read request 170, wherein response 175 includes the updated values of the first-portion and the unchanged values of the second portion. The updated values in portion 122a are prepared, by cache controller circuit 101, to be sent in response 175 back to processor circuit 160. The state of portion 122a may also be updated, e.g., in an associated cache tag, to indicate that portion 122a includes clean entries and modified entries, but no invalid entries (e.g., portion 122a is in the full state as described above).

In some embodiments, method 600 may end in block 650, or in other embodiments, may repeat some or all operations. For example, method 600 may return to block 620 in response to receiving a different read request to a different portion that is indicated as being in the partial state. It is noted that the method of FIG. 6 is merely an example for performing a read request in a cache memory system.

Figure 7:
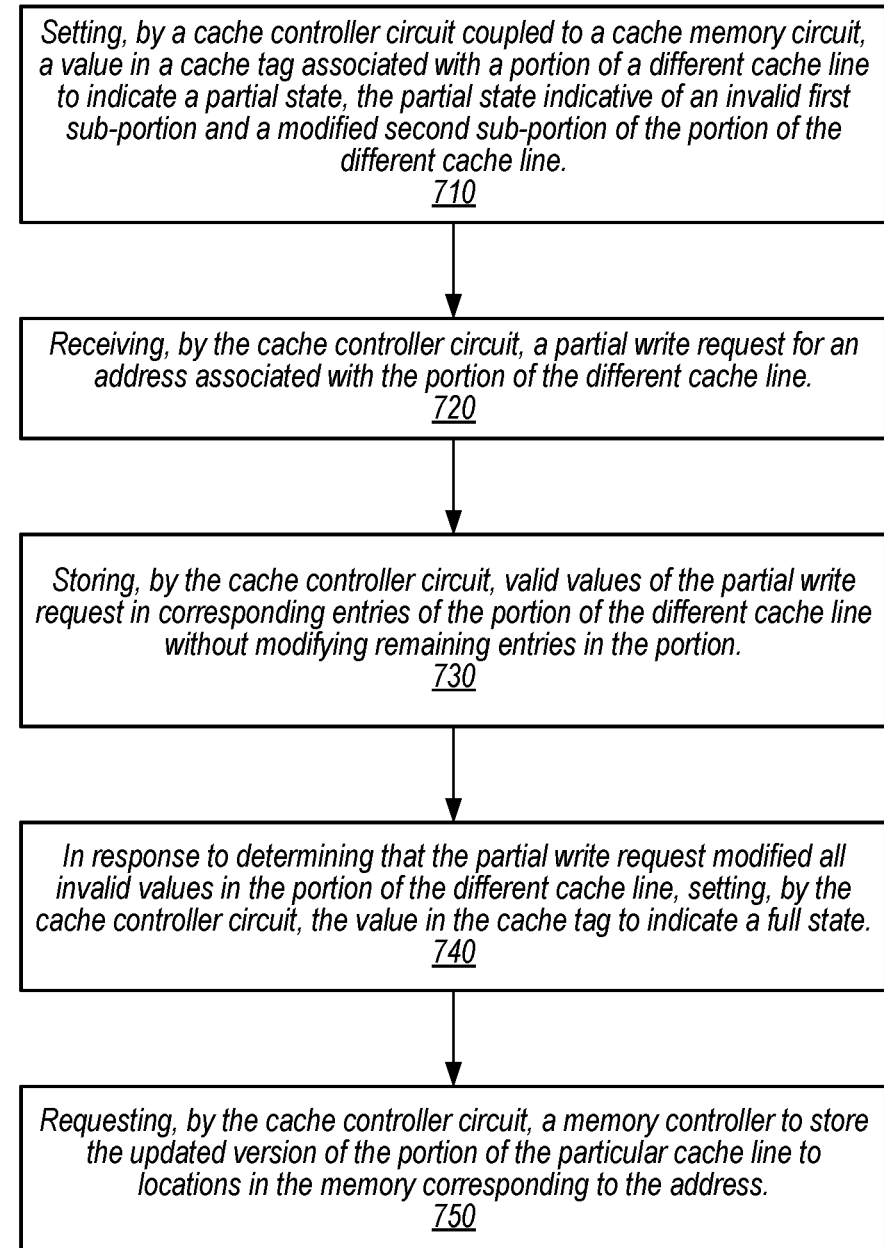
FIG. 7 shows a flow diagram of an embodiment of a method for performing a partial write request in a cache memory system.

Turning now to FIG. 7, a flow diagram for an embodiment of a method for receiving a partial write request by a cache memory system is shown. In a similar manner as method 600, method 700 may be performed by a cache controller circuit, such as cache controller circuit 101 in FIG. 1. Referring collectively to FIGS. 1, 4, and 7, method 700 begins in block 710.

Method 700, at block 710, includes setting, by cache controller circuit 101 coupled to cache memory circuit 110, a value in a cache tag associated with a portion of a different cache line to indicate a partial state, the partial state indicative of an invalid first sub-portion and a modified second sub-portion of the portion of the different cache line. As illustrated, cache controller circuit 101 may set, for a cache tag corresponding to portion 120a, a state indicator, such as state 246 in cache tag table 240 of FIG. 2, to a particular value (e.g., "111") to indicate that portion 120a is in the partial state. Portion 120a is in the partial state due to a first sub-portion, including entries 230d, 230g, and 230h, having invalid (or in the case of 230h, mask 365) values, and due to entries 230c and 230e having modified values.

At block 720, method 700 includes receiving, by cache controller circuit 101, partial write request 470 for an address associated with portion 120a. As illustrated, partial write request 470 includes three values to be stored in memory addresses 455d, 455g, and 455h of memory 145. These addresses are currently cached in portion 120a, and therefore, the values included in partial write request 470 will be stored in cache memory circuit 110.

At block 730, the method also includes storing, by cache controller circuit 101, valid values of partial write request 470 in corresponding entries of portion 120a without modifying remaining entries in portion 120a. As shown, entries 230d, 230g, and 230h of portion 120a currently correspond to memory addresses 455d, 455g, and 455h. The values from partial write request 470 are, therefore, respectively stored in entries 230d, 230g, and 230h. Values in the other entries of portion 120a remain unchanged.

Method 700 further includes, at block 740, in response to determining that partial write request 470 modified all invalid values in portion 120a, setting, by cache controller circuit 101, the value in the cache tag to indicate a full state. Cache controller circuit 101, as shown, determines that after partial write request 470 is fulfilled in portion 120a, that none of entries 230a-230h currently include invalid values. Entries 230a, 230b, and 230f include clean values, matching the values in their corresponding memory addresses. The remaining entries, including the three that were just written, include modified values.

The method, at block 750, also includes requesting, by cache controller circuit 101, a memory controller to store the updated version of portion 120a to locations in memory 145 corresponding to the address. As depicted, cache controller circuit 101 may issue backfill requests for the three entries that were just modified. Since cache memory system 105 intercepts partial write request 470 from memory 145, cache controller circuit 101 issues the backfill request to update the memory addresses that were targeted by partial write request 470 with the same data. These back fill request may be sent to a memory controller circuit included in, or otherwise associated with, memory 145. Cache controller circuit 101 may also issue backfill requests for any of the other modified entries for which a backfill request has not already been issued. Once the backfill requests are fulfilled, then the corresponding entries 230 in portion 120a may be clean, and the corresponding cache tag may be updated to indicate that portion 120a is in the clean state.

In some embodiments, method 700 may end in block 750, or in other embodiments, may repeat some or all operations. For example, method 700 may return to block 720 in response to receiving a different partial write request to a different portion. It is noted that method 700 is an example for performing a partial write request in a cache memory system.

Figure 8:
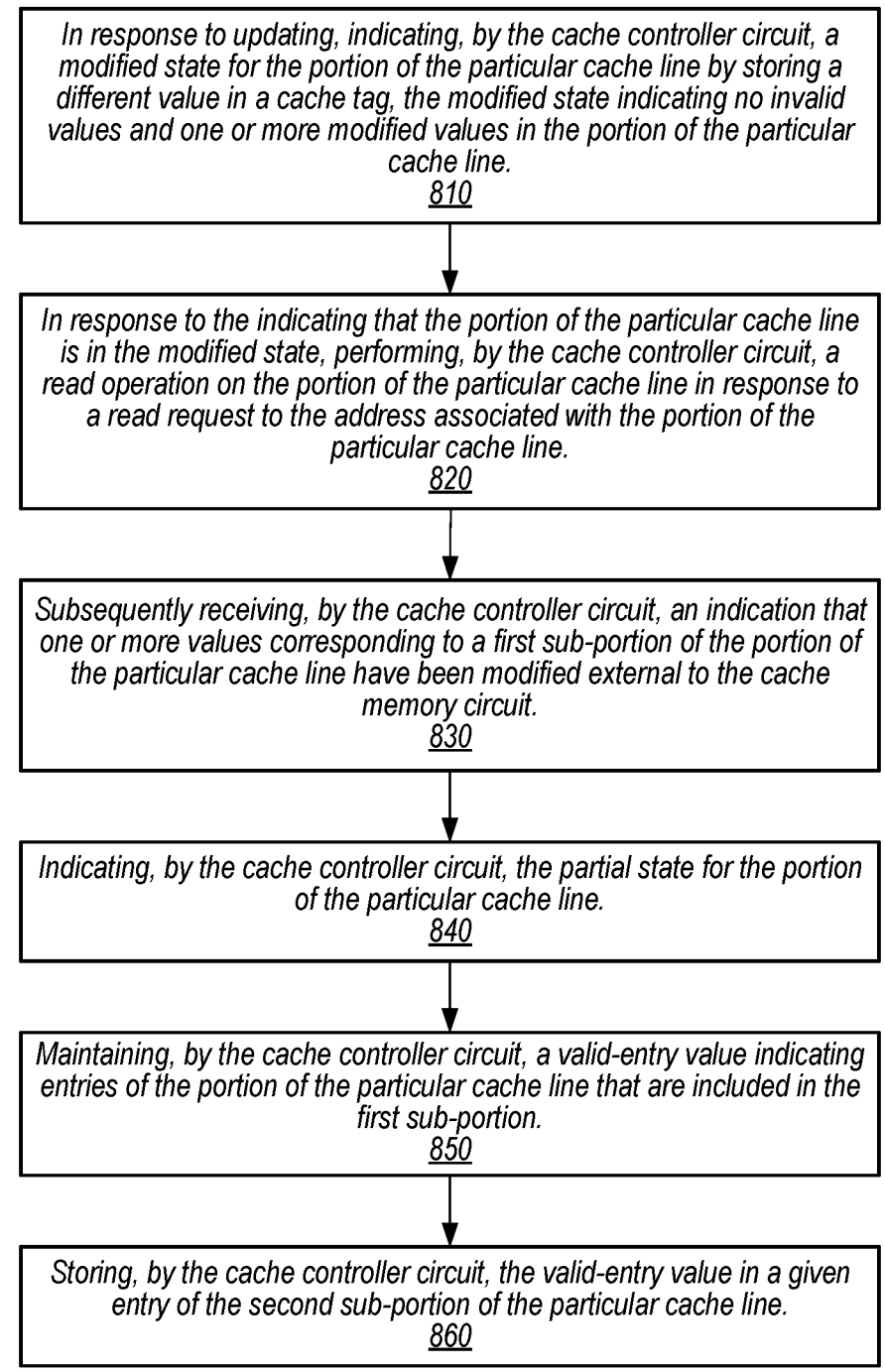
FIG. 8 depicts a flow diagram of an embodiment of a method for receiving an indication that entries in a cache line have been invalidated in a cache memory system.

Proceeding now to FIG. 8, a flow diagram for an embodiment of a method for receiving, by a cache memory system, a notification of a modification of data cached in the cache memory system is shown. Similar to methods 600 and 700, method 800 may be performed by a cache controller circuit, such as cache controller circuit 101 in FIG. 1. Referring collectively to FIGS. 1, 5, and 7, method 700 begins in block 710.

Method 800, at block 810, includes, in response to an updating, indicating, by cache controller circuit 101, a modified state for portion 120b of cache line 120 by storing a different value in a cache tag, the modified state indicating no invalid values and one or more modified values in portion 120a. As shown in FIG. 5, entries 230i-230o include clean values that match their respective addresses in memory 145, while entry 230p includes a modified value that has not yet been backfilled into its corresponding memory location in memory 145. Indicating the modified state (also referred to as the full state) includes storing, by cache controller circuit 101, a particular value in a cache tag associated with portion 120b. For example, a value (e.g., "010" as shown in FIG. 5) for state 246 in cache tag table 240 of FIG. 2 may be set to indicate the modified state in a cache tag corresponding to portion 120b.

At block 820, method 800 includes, in response to indicating that portion 120b is in the modified state, performing, by cache controller circuit 101, a read operation on portion 120b in response to a read request to an address associated with portion 120b. A read request may be received, by cache controller circuit 101 from, e.g., processor circuit 160. The read request may include a request for values from one or more memory addresses that correspond to values currently cached in portion 120b. Since there are no invalid entries in portion 120b, cache controller circuit 101 may read the values from portion 120b and send them in a response to processor circuit 160 without performing an additional fetch request for data from memory 145.

Method 800 further includes, at block 830, subsequently receiving, by cache controller circuit 101, notification 570 that one or more values corresponding to a first sub-portion of portion 120b have been modified external to cache memory system 105. As depicted, notification 570 may be received from any functional circuit included in system 100 that includes circuits for tracking coherency of cached values. For example, system 100 may include two or more cache memory circuits, including other instances of cache memory system 105, a different type of cache memory system, or combinations thereof. In various embodiments, respective cache controller circuits may include coherency circuits and in response to modifying a respective cached value, issue a notification, such as notification 570, to the other cache memory circuits to inform them of the modification. In other embodiments, system 100 may include a centralized coherency circuit that receives indications of modifications from the respective cache memory systems and then issues notifications to cache memories known to be caching values from the same memory addresses.

The method, at block 840, also includes indicating, by cache controller circuit 101, the partial state for portion 120b. In response to notification 570, cache controller circuit 101 determines a second sub-portion of entries 230i-230p that remain valid (either clean or modified) and a determines which of the entries are in the invalidated first sub-portion based on notification 570. Cache controller circuit 101 further determines that at least one remaining valid entry is modified. Accordingly, since portion 120b includes at least one invalid entry (entries 230j-230l) and at least one valid modified entry (entry 230p), a cache tag corresponding to portion 120b is updated to indicate the partial state.

At block 850, the method further includes maintaining, by cache controller circuit 101, a valid-entry value indicating entries of portion 120b that are included in the second sub-portion. In FIG. 5, a valid-entry value (also referred to herein as a "mask value" or simply "mask") is generated when a portion includes one or more invalid entries, using bit values of "1" to indicate valid entries and bit values of "0" to indicate invalid entries. Mask 565 is generated in response to the invalidation of entries in portion 120b based on notification 570, mask 565 indicating that entries 230i and 230m-230p are in the second (valid) sub-portion and entries 230j-230l are in the first (invalid) sub-portion.

Method 800, at block 860, includes storing, by cache controller circuit 101, the valid-entry value in a given entry of the first sub-portion of portion 120b. As shown in FIG. 5, one of the invalid entries in the first sub-portion is replaced with mask 565. As previously described, mask 565 is always stored in the most significant entry of an associated portion in the illustrated examples. In other embodiments, a different one of the entries may be used for storing mask 565. Storing mask 565 includes shifting values in all valid entries (clean or modified) to the next least significant entry until a first invalid entry is overwritten. In FIG. 5, data values 335m-335p are shifted into entries 230l-230o, and mask 565 is placed into entry 230p.

In various embodiments, method 800 may end in block 860, or may repeat some or all operations. For example, method 800 may return to block 830 in response to receiving a different notification. It is noted that method 800 is a simplified example for managing receipt of a notification in a cache memory system. Performance of various operations of methods 600, 700, and 800 may be performed concurrently and/or in an interleaved fashion. For example, cache controller circuit 101 may be configured to manage multiple memory requests, thereby allowing for different processor circuits to issue overlapping memory requests for values cached in different cache lines of cache memory system 105. For example, a first read request to portion 120a may be performed by cache controller circuit 101 while a notification associated with portion 122b is received. Accordingly, method 800 may be performed while method 600 is in progress.

Use of the circuits and methods disclosed herein may enable a cache memory system to be implemented that allows validity tracking down to a word or byte level, while retaining other management functions at a cache line level and/or portions of the cache line that include multiple words/bytes. Such a cache memory system may provide an increased level of flexibility and efficiency as compared to a cache memory system in which management of cached data is performed at the cache line level.

Figure 9:
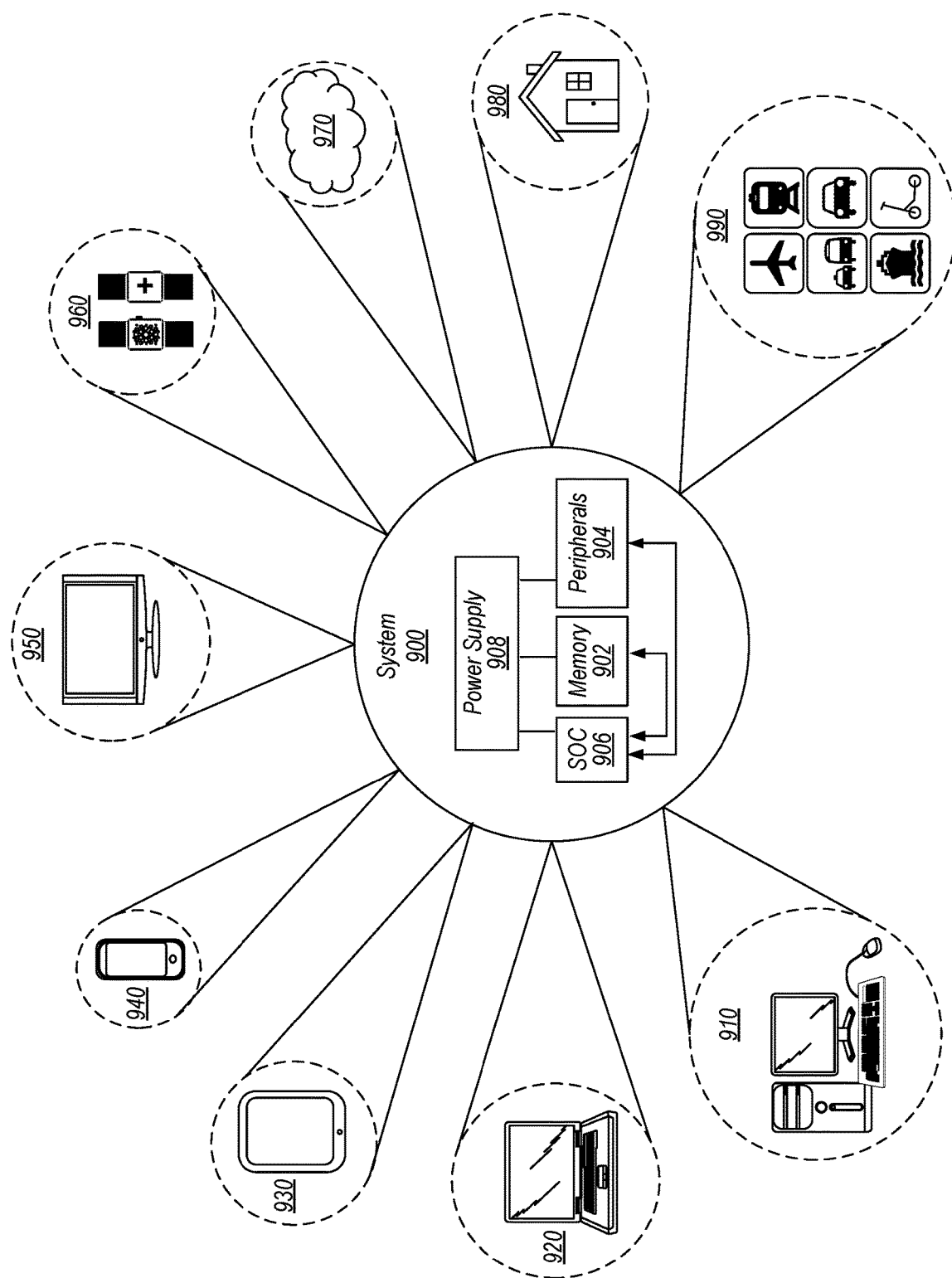
FIG. 9 illustrates various embodiments of systems that include coupled integrated circuits.

FIGS. 1-8 illustrate circuits and methods for a system that includes a cache memory system capable of tracking validity to a byte or word level. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 900 is illustrated in FIG. 9.

Computer system 900 may, in some embodiments, include any disclosed embodiment of system 100.

In the illustrated embodiment, the system 900 includes at least one instance of a system on chip (SoC) 906 which may include multiple types of processing circuits, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 970 are contemplated as well, such as devices worn around the neck, devices attached to hats or other headgear, devices that are implantable in the human body, eyeglasses designed to provide an augmented and/or virtual reality experience, and so on.

System 900 may further be used as part of a cloud-based service(s) 980. For example, the previously mentioned devices, and/or other devices, may access computing resources in the cloud (i.e., remotely located hardware and/or software resources). Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise.

It is noted that the wide variety of potential applications for system 900 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 9 are illustrative only and are not intended to be limiting. Other devices are possible and are contemplated.

As disclosed in regards to FIG. 9, computer system 900 may include one or more integrated circuits included within a personal computer, smart phone, tablet computer, or other type of computing device. A process for designing and producing an integrated circuit using design information is presented below in FIG. 10.

Figure 10:
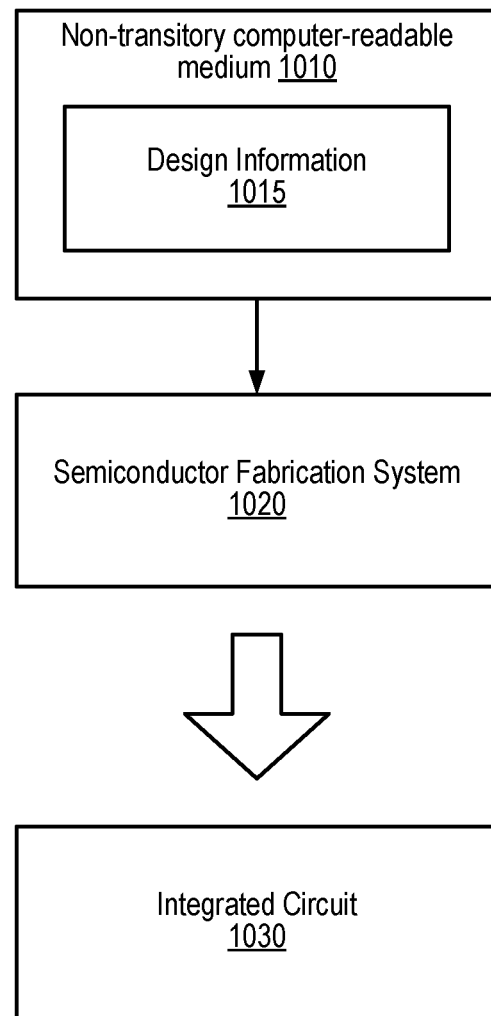
FIG. 10 shows a block diagram of an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, for example, system 100 as shown in FIG. 1. In the illustrated embodiment, semiconductor fabrication system 1020 is configured to process the design information 1015 stored on non-transitory computer-readable storage medium 1010 and fabricate integrated circuit 1030 (e.g., system 100) based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U. S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
a cache memory circuit configured to store a plurality of cache lines;
a cache controller circuit configured to:
receive a read request to an address associated with a portion of a particular cache line; and
in response to an indication that the portion of the particular cache line currently has at least a first sub-portion that is invalid and at least a second sub-portion that is modified relative to a version in a memory:
fetch values corresponding to the address from the memory;
generate an updated version of the portion of the particular cache line by using the fetched values to update the first sub-portion, but not the second sub-portion, of the portion of the particular cache line; and
generate a response to the read request that includes the updated version of the portion of the particular cache line.

2. The apparatus of claim 1, wherein the cache controller circuit is further configured to:
set a value in a cache tag associated with the portion of the particular cache line to indicate a partial state, the partial state indicative of the invalid first sub-portion and the modified second sub-portion; and
set the value in the cache tag to indicate a full state, the full state indicative of the updated version of the invalid first sub-portion.

3. The apparatus of claim 2, wherein the cache controller circuit is further configured to:
receive a partial write request to a different address that corresponds to a portion of a different cache line; and
in response to a determination that a value in a different cache tag corresponding to the portion of the different cache line indicates a partial state, store valid values of the partial write request in corresponding entries of the portion of the different cache line without modifying remaining entries in the portion.

4. The apparatus of claim 3, wherein the cache controller circuit is further configured to:
in response to a determination that the partial write request modified all invalid values in the portion of the different cache line, set the value in the cache tag to indicate a full state.

5. The apparatus of claim 1, wherein the cache controller circuit is further configured to:
receive a subsequent read request to the address associated with the portion of the particular cache line; and in response to a determination that the portion of the particular cache line is currently valid, generate a response to the subsequent read request that includes the portion of the particular cache line.

6. The apparatus of claim 1, wherein the cache controller circuit is further configured to:
receive a subsequent read request to a different address associated with a portion of a different cache line;
in response to an indication that the portion of the different cache line currently has a first sub-portion that is invalid and a second sub-portion that is unmodified relative to a version in the memory:
fetch different values corresponding to the different address from the memory;
generate a response to the subsequent read request that includes the different fetched values; and
update the portion of the different cache line.

7. The apparatus of claim 1, wherein the cache controller circuit is further configured to send a request to a memory controller to store the updated version of the portion of the particular cache line to locations in the memory corresponding to the address.

8. The apparatus of claim 1, wherein the cache controller circuit is further configured to:
track validity of data stored in a given cache line for individual bytes of the given cache line; and
maintain respective cache tags for two portions of the given cache line, wherein each of the two portions is a respective half of the given cache line.

9. A method comprising:
indicating, by a cache controller circuit coupled to a cache memory circuit, a partial state for a portion of a particular cache line of the cache memory circuit in response to determining that the portion currently includes a first sub-portion that is invalid and a second sub-portion that is modified relative to a version in a memory;
receiving, by the cache controller circuit, a read request for an address associated with the portion of the particular cache line;
fetching, by the cache controller circuit, values from the memory corresponding to the address;
updating, by the cache controller circuit using the fetched values, values of the first sub-portion, while values of the second sub-portion remain unchanged; and
responding, by the cache controller circuit, to the read request, wherein the response includes the updated values of the first-portion and the unchanged values of the second sub-portion.

10. The method of claim 9, wherein the indicating the partial state includes storing, by the cache controller circuit, a particular value in a cache tag associated with the portion of the particular cache line.

11. The method of claim 10, further comprising:
in response to the updating, indicating, by the cache controller circuit, a modified state for the portion of the particular cache line by storing a different value in the cache tag, the modified state indicating no invalid values and one or more modified values in the portion of the particular cache line; and
in response to the indicating that the portion of the particular cache line is in the modified state, performing, by the cache controller circuit, a read operation on the portion of the particular cache line in response to a different read request to the address associated with the portion of the particular cache line.

12. The method of claim 9, wherein the first and second sub-portions each include one or more entries of the portion of the particular cache line; and
further comprising:
maintaining, by the cache controller circuit, a valid-entry value indicating entries of the portion of the particular cache line that are included in the second sub-portion; and
storing, by the cache controller circuit, the valid-entry value in a given entry of the first sub-portion of the particular cache line.

13. The method of claim 9, further comprising:
indicating, by the cache controller circuit, a modified state for a portion of a different cache line, the modified state indicating no invalid values and one or more modified values in the portion;
subsequently receiving, by the cache controller circuit, an indication that one or more values corresponding to a first sub-portion of the portion of the different cache line have been modified external to the cache memory circuit; and
indicating, by the cache controller circuit, the partial state for the portion of the different cache line.

14. The method of claim 9, further comprising:
requesting, by the cache controller circuit, a memory controller to store the updated version of the portion of the particular cache line to locations in the memory corresponding to the address; and
indicating, by the cache controller circuit, a full state for the portion of the particular cache line, the full state indicating no invalid values and no modified values in the portion.

15. A system, comprising:
a memory;
a processor circuit configured to generate read and write requests for addresses in the memory; and
a cache memory system configured to:
cache, in portions of cache lines, values associated with the read and write requests generated by the processor circuit;
indicate, for a portion of a particular cache line, a partial state indicating that the portion of the particular cache line currently includes a first sub-portion that is invalid and a second sub-portion that is modified relative to a corresponding address in the memory;
in response to receiving, from the processor circuit, a read request for an address associated with the portion, fetch values from the memory corresponding to the address;
update, using the fetched values, values of the first sub-portion, while values of the second sub-portion remain unchanged; and
respond to the read request using the updated values of first sub-portion and the unchanged values of the second sub-portion.

16. The system of claim 15, wherein the cache memory system is further configured to:
track validity of data stored in the particular cache line for individual bytes of the particular cache line;
maintain a cache tag for the portion of the particular cache line; and
store a partial flag value in the cache tag to indicate the partial state.

17. The system of claim 16, wherein the cache memory system is further configured to:

in response to the update, store a modified flag value in the cache tag to indicate a modified state, the modified state indicative of no invalid values and one or more modified values in the portion.

18. The system of claim 17, wherein the cache memory system is further configured to:
receive an indication that one or more values included in a third sub-portion of the portion of the particular cache line have been modified external to the cache memory system;
determine whether any modified values remain in the second sub-portion;
in response to a determination that at least one modified value remains in the second sub-portion, store the partial flag value in the cache tag to indicate the partial state; and
in response to a determination that no modified values remain in the second sub-portion, store a partial clean flag value in the cache tag to indicate that at least one value in the portion is invalid but no valid values in the portion are modified relative to a corresponding address in the memory.

19. The system of claim 15, wherein the portion of the particular cache line includes the entirety of the particular cache line.

20. The system of claim 15, wherein the cache memory system is further configured to:
determine to invalidate the particular cache line; and
in response to the determination, indicate a locked state for the portion of the particular cache line, wherein the locked state prevents further modifications to the values in the portion until the particular cache line has been evicted.

* * * * *

UNITED STATES PATENT AND TRADEMARK OFFICE
CERTIFICATE OF CORRECTION

| | |
|---|---|
| PATENT NO. | : 11,586,552 B2 |
| APPLICATION NO. | : 17/320172 |
| DATED | : February 21, 2023 |
| INVENTOR(S) | : Ilya Granovsky et al. |

It is certified that error appears in the above-identified patent and that said Letters Patent is hereby corrected as shown below:

In the Claims

In Column 23 (Claim 9), Line 49, please delete "first-portion" and insert -- first sub-portion --.

In Column 24 (Claim 14), Line 27, please delete "store the updated" and insert -- store an updated --.

In Column 24 (Claim 15), Lines 55-56, please delete "of first" and insert -- of the first --.

Signed and Sealed this
Twenty-fifth Day of April, 2023

Katherine Kelly Vidal
*Director of the United States Patent and Trademark Office*